United States Patent
Burns et al.

(10) Patent No.: US 9,464,646 B2
(45) Date of Patent: Oct. 11, 2016

(54) MOUNTING MECHANISM FOR TOY BAR OF CHILD-SUPPORT DEVICE

(71) Applicant: KIDS II, INC., Atlanta, GA (US)

(72) Inventors: Stephen R. Burns, Cumming, GA (US); Mark Mendes, Loganville, GA (US)

(73) Assignee: KIDS II, INC., Atlanta, GA (US)

( * ) Notice: Subject to any disclaimer, the term of this patent is extended or adjusted under 35 U.S.C. 154(b) by 25 days.

(21) Appl. No.: 14/025,221

(22) Filed: Sep. 12, 2013

(65) Prior Publication Data

US 2014/0072365 A1  Mar. 13, 2014

Related U.S. Application Data

(60) Provisional application No. 61/700,837, filed on Sep. 13, 2012.

(51) Int. Cl.
*A63H 33/00* (2006.01)
*F16B 1/00* (2006.01)

(52) U.S. Cl.
CPC ............... *F16B 1/00* (2013.01); *A63H 33/006* (2013.01); *Y10T 403/59* (2015.01)

(58) Field of Classification Search
CPC .. A63H 33/006; A47D 13/02; A47D 13/105; B60N 2/2845; G06F 1/187; A63B 2208/12; B62B 9/26
See application file for complete search history.

(56) References Cited

U.S. PATENT DOCUMENTS

| | | | |
|---|---|---|---|
| 2,490,230 A * | 12/1949 | Riegel | 446/227 |
| 3,251,543 A * | 5/1966 | Bush et al. | 235/1 R |
| 3,912,291 A * | 10/1975 | Frisch | 280/33.992 |
| 5,123,767 A | 6/1992 | Ishikura et al. | |
| 5,294,172 A * | 3/1994 | Dubus | 297/148 |
| 5,758,889 A * | 6/1998 | Ledakis | 280/47.38 |
| 6,170,910 B1 * | 1/2001 | Bapst | A47C 7/66 16/377 |
| 6,592,425 B2 * | 7/2003 | Bapst et al. | 446/227 |
| 6,594,840 B2 | 7/2003 | Tomas et al. | |
| 6,705,950 B2 * | 3/2004 | Wood et al. | 472/118 |
| 6,739,649 B2 | 5/2004 | Kelly et al. | |
| 6,742,749 B2 | 6/2004 | Kassai et al. | |
| 6,764,133 B2 * | 7/2004 | Osato | 297/217.4 |
| 6,854,799 B1 | 2/2005 | Asbach et al. | |
| 7,445,229 B2 | 11/2008 | Dotsey et al. | |
| 7,766,367 B2 | 8/2010 | Dotsey et al. | |

(Continued)

FOREIGN PATENT DOCUMENTS

| | | |
|---|---|---|
| EP | 2628415 A1 | 8/2013 |
| WO | 2013003320 A2 | 1/2013 |
| WO | 2013039975 A2 | 3/2013 |

*Primary Examiner* — Michael Dennis
*Assistant Examiner* — Urszula M Cegielnik
(74) *Attorney, Agent, or Firm* — Gardner Groff Greenwald & Villanueva, PC (57) ABSTRACT

A male inserter and a female receiver fixed to a toy bar and a child-support device for relative movement between upright locked and inclined unlocked positions. The male inserter includes a lock element and the female receiver includes a catch surface. In the upright unlocked position, the male inserter can pass through the female receiver. But in the inclined locked position, the lock element engages and locks against the catch surface. If a child in the child-support device pulls down and/or forward on the toy bar in the locked position, it does not move to the unlocked position. But an upward lifting force applied to the toy bar causes it to pivot from the locked position to the unlocked position and to then detach from the child-support device.

20 Claims, 9 Drawing Sheets

(56) References Cited

U.S. PATENT DOCUMENTS

| | | |
|---|---|---|
| 7,963,896 B2 * | 6/2011 | Nanna et al. ................. 482/142 |
| 8,303,033 B2 | 11/2012 | Lundeen |
| 8,469,388 B2 | 6/2013 | Moore |
| 8,491,401 B2 | 7/2013 | Szymanski |
| 8,544,949 B2 | 10/2013 | Taton |
| 8,608,527 B2 | 12/2013 | O'Connor et al. |
| 8,727,191 B2 | 5/2014 | Winterhalter et al. |
| 8,771,033 B2 | 7/2014 | Goszewski et al. |
| 8,795,023 B2 | 8/2014 | Elson |
| 8,845,028 B2 | 9/2014 | Miller |
| 8,845,441 B2 | 9/2014 | Trapp et al. |
| 8,864,547 B2 | 10/2014 | Elson et al. |
| 8,893,325 B2 | 11/2014 | Arnold, IV et al. |
| 8,920,208 B2 | 12/2014 | Elson |
| 2003/0151283 A1 * | 8/2003 | Pogue et al. ................. 297/250.1 |
| 2005/0054486 A1 | 3/2005 | Turner et al. |
| 2006/0199166 A1 * | 9/2006 | Snyder et al. ................. 434/365 |
| 2007/0224909 A1 * | 9/2007 | Schoenfelder et al. ...... 446/227 |
| 2008/0012406 A1 | 1/2008 | Piwko, Jr. et al. |
| 2009/0205140 A1 | 8/2009 | Reese et al. |
| 2010/0109398 A1 * | 5/2010 | Moulin et al. ............. 297/217.3 |
| 2010/0163088 A1 * | 7/2010 | Zeng ......................... 135/88.02 |
| 2010/0320821 A1 * | 12/2010 | Trapp et al. ................... 297/274 |
| 2011/0037298 A1 * | 2/2011 | Mendes et al. .......... 297/188.21 |
| 2014/0315650 A1 | 10/2014 | Pyrce et al. |
| 2015/0042130 A1 * | 2/2015 | Perrin et al. ................... 297/135 |

\* cited by examiner fig.1 fig. 2 fig. 3

MOUNTING MECHANISM FOR TOY BAR OF CHILD-SUPPORT DEVICE

CROSS-REFERENCE TO RELATED APPLICATION

This application claims the benefit of U.S. Provisional Patent Application Ser. No. 61/700,837 filed Sep. 13, 2012, the entirety of which is hereby incorporated by reference herein.

TECHNICAL FIELD

The present invention relates generally to the field of devices for supporting children, and more particularly to mechanisms for mounting a toy bar on such a child-support device.

BACKGROUND

The field of child-support devices generally includes bouncers, rockers, swings, motion devices, car seats, carriers, strollers, bassinets, cribs, play yards, high chairs, and the like. Commonly, such child-support devices include a seat for supporting the child in a sitting, reclining, lying, or standing position, and a bar spaced apart from the seat. Typically, the bar is used to mount (e.g., in suspension) toys so that the toys are positioned in front of or above the child (e.g., at hand-to-eye level) for visual, audible, and/or tactile interaction and amusement.

Under current ASTM standards, if a child-support device can be lifted by any part of it, then that part is considered to be a handle and therefore it must confirm to certain prescribed load-bearing standards for handles. Thus, if applying an upward force to the toy bar causes the child-support device to be lifted, then the toy bar must meet the ASTM load-bearing standards for handles. But designing toy bars to withstand such loads adds to the cost and complexity of the child-support devices.

Accordingly, it can be seen that needs exist for improved mounting mechanisms for toy bars of child-support devices that address load-bearing issues. It is to the provision of solutions meeting these and other needs that the present invention is primarily directed.

SUMMARY

Generally described, the present invention relates to mechanisms for mounting toy bars to child-support devices. The mounting mechanisms each include a male insertion element and a female receiving element fixedly associated with a toy bar and a child-support device such that movement of the toy bar relative to the child-support device moves the male inserter relative to the female receiver between upright unlocked and inclined locked positions.

The male inserter includes a lock element and the female receiver includes a catch surface. In the upright unlocked position, the male inserter can pass through in and out the female receiver. But in the inclined locked position, the lock element of the male inserter engages and locks against the catch surface of the female receiver. The force of gravity on the toy bar causes it to move from the upright unlocked position to the locked position and stay there. If a child in the child-support device pulls down and/or forward on the toy bar, such a force does not move the toy bar from the locked position to the unlocked position. But an upward lifting force applied by a caregiver to the toy bar causes it to pivot from the locked position to the unlocked position and to then detach from the child-support device.

Because attempting to lift the child-support device by the toy bar causes the toy bar to automatically detach (with no other action required) from the child-support device, the toy bar cannot be used as a handle. So instead of the toy bar and the mounting mechanism including structural features to meet the load-bearing requirements for handles, the need to meet those requirements is completely eliminated.

In typical embodiments, the mounting mechanism can be used with a toy bar for supporting for child occupant use toys such as plush animals, other plush toys, noise-makers, models, and other objects and devices such as lights, projectors, or character images for the amusement, education, entertainment, or just interest and engagement (mentally and/or physically) of the child occupant. And the mounting mechanism can be used for mounting such a toy bar to child-support devices such as bouncers, rockers, swings, motion devices, car seats, carriers, strollers, bassinets, cribs, play yards, high chairs, and other devices for supporting the child in a sitting, reclining, lying, or standing position.

These and other aspects, features, and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1-5 show a mechanism 10 for mounting a toy bar 80 to a child-support device 90 according to a first example embodiment of the invention. The child-support device 90 includes a frame 92 that provides structural support. The toy bar 80 includes one or more frame-mounting portions 82 that removably mount to the frame 92 via the mounting mechanism 10 and at least one toy-mounting portion 84 for mounting one or more toys 86 for use by a child occupying the child-support device 90. The toy bar 80 can be used to support toys 86 such as plush animals, other plush toys, noise-makers, models, and other objects and devices for the amusement, education, entertainment, or just interest and engagement (mentally and/or physically) of the child occupant, and as such the toy bar is not limited to use with only conventional "toys."

In the depicted embodiment, the child-support device 90 that the toy bar 80 is mounted to via the mounting mechanism 10 is a bouncer 90. As such, the bouncer 90 includes a child receptacle (e.g., a seat) 94 that is supported by the frame and that supports a child occupant. And the frame 92 includes a base 92a for resting stably on a support surface (e.g., a floor), a seat support 92c to which the child receptacle 94 is attached, and a resiliently flexible arm 93c extending between the base and the seat support to provide an oscillating bouncing action when a force is momentarily applied to the child receptacle. In addition, the toy bar 80 has two frame-mounting portions 82 and one of the toy-mounting portions 84 extending therebetween, with the frame-mounting portions at opposing ends of the bar for mounting to two opposing sides of the frame seat support 92b, and with the toy-mounting portion overhanging the child receptacle 94.

In other embodiments, the mounting mechanism 10 is used with other child-support devices such as rockers, swings, motion devices, car seats, carriers, strollers, bassinets, cribs, play yards, high chairs, and other devices for supporting the child in a sitting, reclining, lying, or standing position. In such other embodiments, the frame includes other elements such as rockers arms, suspension straps, legs, wheels on legs, and the like. And in other such embodiments, the toy bar can be mounted at only one end in a cantilevered fashion, mounted to another portion of the frame of the child-support device, and/or mounted at or to other components of the child-support device, with modifications apparent to those of ordinary skill in the art.

Referring particularly to FIGS. 2-5, the mounting mechanism 10 includes a male insertion element 12 and a female receiving element 14 through which the male inserter can pass in a first position (FIGS. 2 and 4) and through which it cannot pass in a second position (FIGS. 3 and 5) angled relative to the first position. As such, in the second position the male inserter 12 is locked in the female receiver 14, and in the first position it is not (i.e., the male inserter is free to be inserted into or withdrawn from the female receiver). The male inserter 12 and the female receiver 14 are on or in the toy bar 80 and the child-support device 90 such that movement of the toy bar relative to the child-support device moves the male inserter relative to the female receiver between the locked and unlocked positions. In typical embodiments such as that depicted, the relative movement is pivoting, though in other embodiments the mounting mechanism is designed for lateral displacement, vertical helical/screw motion, or another movement between the locked and unlocked positions.

With this design of the mounting mechanism 10, the force of gravity on the toy bar 80 causes it to move to the locked position, absent other external counter forces on it. And if a child in the child-support device 90 pulls down and/or forward on the toy bar 80, such a force is not in the direction needed to move the toy bar from the locked position to the unlocked position. But an upward lifting force applied to the toy bar 80 causes it to pivot from the locked position to the unlocked position and to then detach from the child-support device 90. Because attempting to lift the child-support device 90 by the toy bar 80 causes the toy bar to automatically detach (with no other action required) from the child-support device, the toy bar cannot be used as a handle. So instead of the toy bar 80 and the mounting mechanism 10 including structural features to meet the load-bearing requirements for handles, the need to meet those requirements is completely eliminated. Thus, no additional locking mechanism is included that requires user actuation to unlock the toy bar 80 from the child-support device 10.

In the depicted embodiment, the male inserter 12 is fixedly located at (attached to, integrally formed with, etc.) the mounting portion 82 of the toy bar 80, and the female receiver 14 is fixedly located at (attached to, integrally formed with, defined by, etc.) a housing 16 on (attached to, integrally formed with, etc.) the seat support 92b of the frame 92. It will be understood that the term "housing" is intended to be broadly construed to include not only an enclosure but also any structure that can be formed to define and provide the functionality of the female receiver as described herein, with the female receiver including all the elements of the housing that interact with the male inserter. In other embodiments, the male and female elements are reversed, with the male inserter located at the seat support of the frame, the female receiver located at a housing on the mounting portion of the toy bar, and the female receiver pivotal while the male inserter is stationary (one part pivotal relative another part means either part can do the pivoting).

The male inserter 12 includes a locking element 18, which can be in the form of a foot, tab, boss, arm, ledge, finger, recessed wall, or the like, or a partial surface thereof. The locking element 18 extends laterally relative to an axis 20 of travel of the male inserter 12, and typically is inclined downward (see FIG. 2) as it extends away from the axis. The toy bar 80 and the male inserter 12 fixed to it pivot (i.e., rotates or tilts) between the first unlocked position and the second locked position. The locking element 18 extends from the male inserter 12 in the same plane in which it pivots. The male inserter 12 is generally upright (i.e., substantially but not necessarily perfectly vertical, e.g., includes tilted slightly forward from vertical as depicted) in the first unlocked position and inclined (i.e., angled relative to vertical) in the second locked position. Although the depicted embodiment includes only one male inserter 12, other embodiments include multiple of them.

The female receiver 14 is typically formed by internal elements of the housing 16. For example, the female receiver 14 can be formed by an annular member attached to, held by, or integrally formed as a part of the housing 16, as depicted. Alternatively, the female receiver can be formed by two facing walls, two or more peripherally arranged pins, and/or two or more other spaced-apart structures of a housing or of the child-support device itself. In any event, the female receiver 14 includes two spaced-apart elements (e.g., surfaces/portions of the annular member) in the pivot plane of the male inserter 12, a forward guide surface 22 and a rearward guide surface 23, that between them define a lock opening 26. The guide surfaces 22 and 23 are spaced apart far enough for the lock opening 26 to receive the male inserter 12, including the lock element, in the upright unlocked position, but close enough to provide the locking effect (described herein) when the male inserter is in the inclined locked position (and also to prevent excessive play during insertion/withdrawal). The mounting mechanism 10 is typically mounted in an orientation such that the guide openings 22 and 23 are generally upright (for receiving the male inserter 12) but tilted forward slightly (to induce the toy bar 80 to tilt slight forward in its upright position and thus pivot forward by gravity to the locked position). In other embodiments the guide openings may be vertical, for example in embodiments in which the toy bar is moved to the locked position by other means such as a spring element. And a catch surface 24 extends laterally from the rearward guide surface 23 and engages the lock element 18 when the male inserter 12 is in the inclined locked position.

In addition, the mounting mechanism 10 includes a mechanical stop to limit the distance the male inserter 12 can be inserted into the female receiver 14. The mechanical stop includes an engagement surface 28 defined by the male inserter 12 and a stop surface 30 defined by the female receiver 14 or another structure of the housing 16.

In the depicted embodiment, the engagement surface is formed by a bottom surface of a protrusion extending laterally forward from the male inserter 12, and the stop surface 30 is formed by a top surface of the annular member of the female receiver 14. The engagement surface 28 is positioned above the locking element 18 and the stop surface 30 is positioned above the catch surface 24, with the engagement surface resting atop and blocked from further insertion by contact with the stop surface. The engagement surface 28 and the stop surface 30 are configured to limit the insertion depth of the male inserter 12 relative to the female receiver 14 to where the locking element 18 of the male inserter is sufficiently below the catch surface 24 of the female receiver that the locking element can be pivoted into locking engagement with and below the catch surface.

Many other conventional mechanical stops can be used in the mounting mechanism 10, so long as they are configured to limit the insertion depth as just described. For example, the mechanical stop can be provided by a bottom surface of the male inserter that bottoms out on an inner wall or other surface of the housing, or by other conventional mechanical stop of a type within the knowledge of those of ordinary skill in the art. Although the depicted embodiment includes only one set of the cooperating engagement and stop surfaces 28 and 30, other embodiments include multiple of them.

In the depicted embodiment, the toy bar is pivoted from the upright unlocked position to the inclined locked position by gravity. In other embodiments, the toy bar is moved from the unlocked (upright or otherwise) position to the locked (inclined or otherwise) position by another mechanism. For example, a spring element can be provided that spring-biases the toy bar to the locked position, with the toy bar movable to the unlocked position against the spring force.

Figure 1:
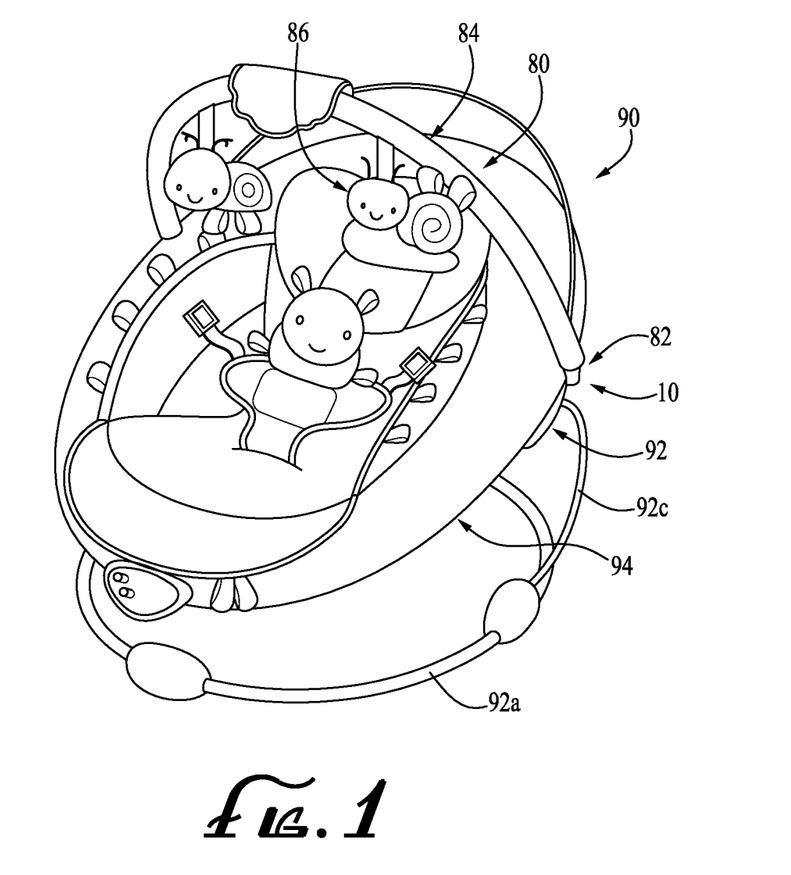
FIG. 1 is a perspective view of a mechanism for mounting a toy bar to a child-support device according to a first example embodiment of the present invention.
Figure 2:
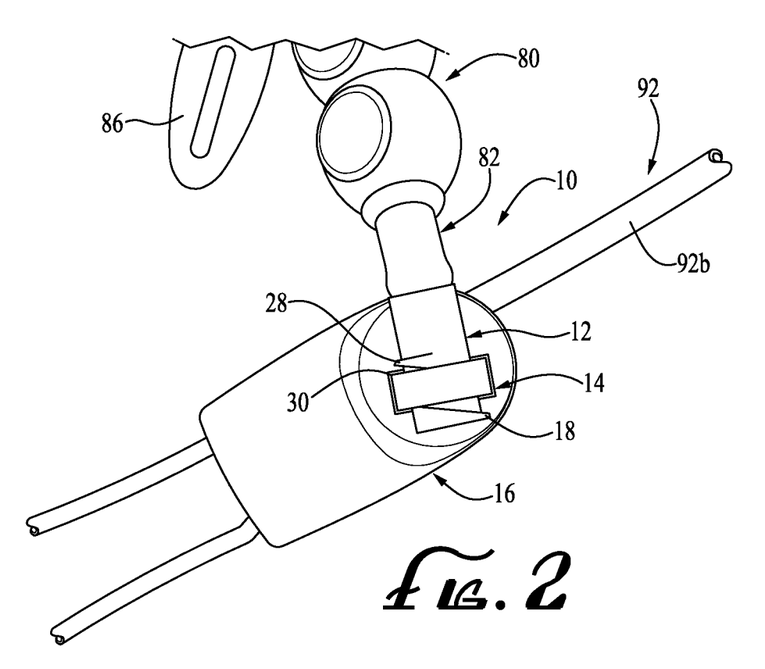
FIG. 2 is a perspective view of the mounting mechanism, and a portion of the toy bar and the child-support device, of FIG. 1, with a portion of the housing removed to reveal the internal components and show the toy bar in a first unlocked position.
Figure 3:
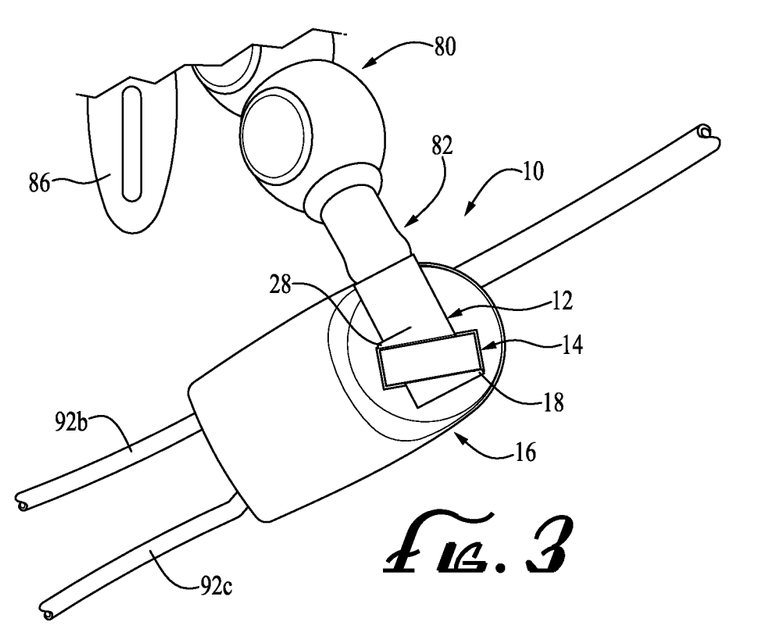
FIG. 3 shows the mounting mechanism, toy bar, and child-support device of FIG. 1 in a second locked position.
Figure 4:
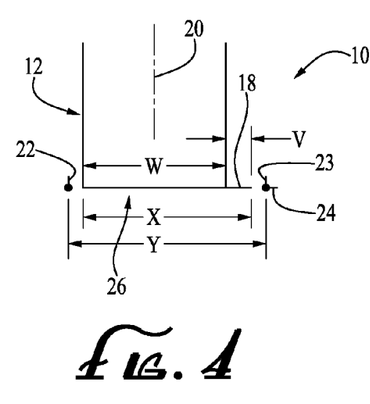
FIG. 4 is a schematic view of the mounting mechanism of FIG. 2 with the toy bar in the first unlocked position.
Figure 5:
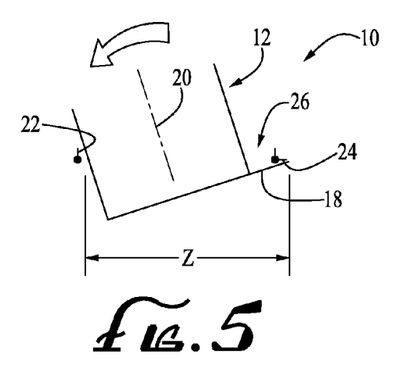
FIG. 5 is a schematic view of the mounting mechanism of FIG. 3 with the toy bar in the second locked position.

Referring particularly to FIGS. 4-5, in the pivot plane (the plane of the drawing sheet), the lateral dimension of the locking element 18 is V, and the lateral dimension of the male inserter 12 at (but excluding) the locking element is W, with the total/combined lateral dimension being X. And the lateral dimension of the lock opening 26, between the guide surfaces 22 and 23 at their closest lateral points in the pivot plane, is Y. So when the male inserter 12 is in the upright unlocked position, the lateral dimension in the pivot plane of its footprint at the horizontal level of the locking element 16 is X. But when the male inserter 12 is in the inclined locked position, the lateral dimension in the pivot plane of its footprint at the horizontal level of the locking element 16 is increased to Z. As can be seen in the drawing figures, Z is larger than Y, which is larger than X. So the male inserter 12 with the locking element 16 can fit through the lock opening 26 when the male inserter is in the upright unlocked position, but not when it's been pivoted forward (as indicated by the angular motion arrow) to the inclined locked position. In particular, in the inclined locked position the locking element 16 pivotally slips rearward under the catch surface 22 of the female receiver 14 and is thus blocked from being withdrawn through the locking opening 26.

Figure 6A:
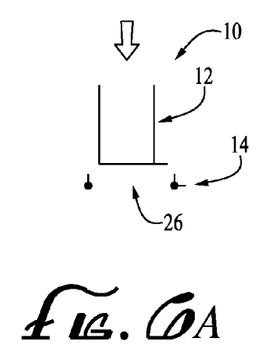
FIGS. 6A-C are schematic views of the mounting mechanism of FIG. 2 showing the toy bar being attached to the child-support device.
Figure 6B:
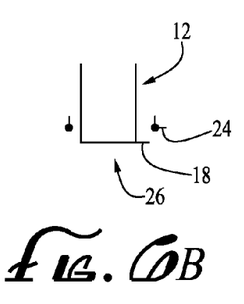
Figure 6C:
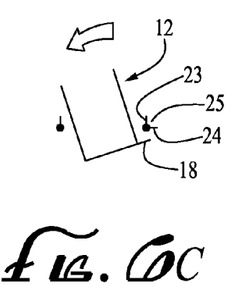

FIGS. 6A-C show the toy bar 80 being attached to the child-support device 90 via the mounting mechanism 10. In FIG. 6A, the toy bar 80 is being lowered from above by the caregiver to thus lower the attached male inserter 12 (as indicated by the linear directional arrow), in a generally upright position and aligned with the lock opening 26, toward the female receiver 14 of the child-support device 90. In FIG. 6B, the male inserter 12 has been fully inserted into the lock opening 26 of the female receiver 14, with the locking element 18 of the male inserter positioned below the level of the catch surface 24 of the female receiver, and with the male inserter stopped and supported by the stop mechanism. And in FIG. 6C, the toy bar 80 has been released by the caregiver, so the force of gravity on the toy bar (typically tilting slightly forward in the upright position) causes the male inserter 12 to pivot forward (as indicated by the angular directional arrow) about a pivot point 25 (e.g., the intersection of the rearward guide surface 23 and the catch surface 24) to the inclined locked position, with the locking element 18 of the male inserter now pivoted into locking engagement with and below the catch surface 24.

In this forward-inclined locked position, the force of gravity on the toy bar 80 biases and thereby retains the locking element 18 of the male inserter 12 in locking engagement with the catch surface 24. That is, the force of gravity on the toy bar 80 would need to be overcome for the male inserter 12 to pivot rearward to the upright unlocked position. If the child in the child-support device 90 pulls down and/or forward (relative to the child and the child-support device) on the toy bar 80, such a force is in the same general direction as the gravity-induced pivoting to the locked position (as indicated by the angular directional arrow). So such a force causes the forward portion of the male inserter 12 to bear against the forward guide surface 22, which increases the pivotal locking effect of the lock element 18 against the catch surface 24, thereby generating retention forces retaining the toy bar 80 in place. Typically such a force is generally opposite (more than 90 degrees from) the direction and/or generally lesser in magnitude than is needed to move the toy bar 80 from the inclined locked position to the upright unlocked position. And typically any component of such a force that is in the general direction needed to unlock the toy bar 80 (pivot it rearward from the inclined locked position to the upright unlocked position) is negligible and less than the countering force of gravity.

Figure 7A:
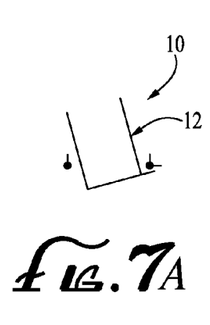
FIGS. 7A-D are schematic views of the mounting mechanism of FIG. 2 showing the toy bar being detached from the child-support device.
Figure 7B:
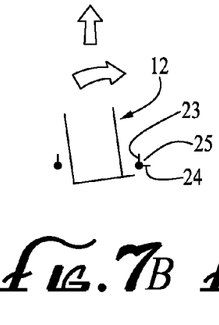
Figure 7C:
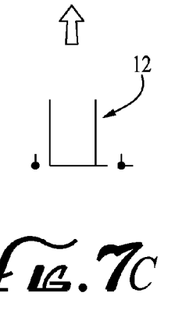
Figure 7D:
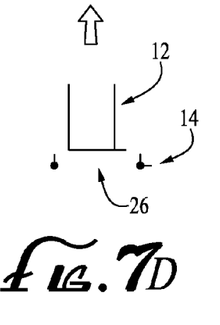
Figure 8:
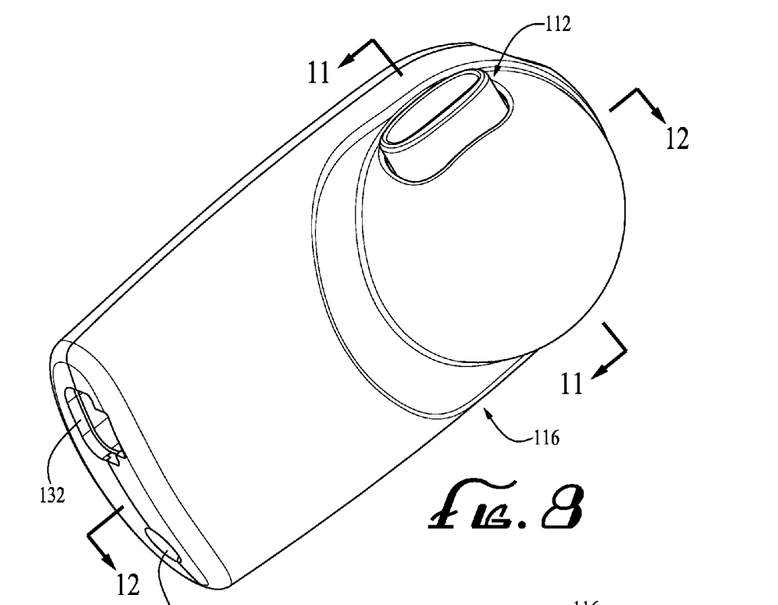
FIG. 8 is a perspective view of a mechanism for mounting a toy bar to a child-support device according to a second example embodiment of the present invention.

FIGS. 7A-D show the toy bar 80 being automatically detached from the child-support device 90 via the mounting mechanism 10 when an attempt is made to lift the child-support device by the toy bar. In FIG. 7A, the toy bar 80 is mounted for use on the child-support device 90 by the mounting device 10, with the male inserter 12 on the toy bar in the inclined locked position (the inclined locked position of this figure corresponds to that of FIG. 6C). In FIG. 7B, a caregiver is applying an upward lifting force (as indicated by the linear directional arrow) to the toy bar 80, which causes the male inserter 12 to pivot rearward (as indicated by the angular directional arrow) about the pivot point 25 from the locked position toward the unlocked position. In FIG. 7C, the continued upward lifting force (as indicated by the linear directional arrow) on the toy bar 80 has caused the male inserter 12 to pivot rearward all the way to the upright unlocked position. And in FIG. 7C, the continued upward lifting force (as indicated by the linear directional arrow) on the toy bar 80 pulls the male inserter 12 in the upright unlocked position up through the lock opening 26 of the female receiver 14, thereby automatically detaching the toy bar from the child-support device 90.

It will be appreciated that the upward lifting force does not to be perfectly vertical to automatically detach the toy bar 80, rather, any generally upward force that a caregiver would apply to the toy bar 80 in an effort to lift the child-support device 90 will produce the automatic detachment. To facilitate this desired functionality, the lock element 18 can be inclined downward as it extends rearward away from the male inserter 12 (see FIG. 1) so that any applied force with a vertical component (e.g., greater than the gravitation force on the toy bar 80) will tend to induce the male inserter 12 to pivot toward the inclined unlocked position. The catch surface 24 can be inclined in the same manner, if so desired.

FIGS. 8-13 show a mechanism 110 for mounting a toy bar to a child-support device according to a second example embodiment of the invention. The mounting mechanism 110 of this embodiment is substantially similar to that of the above-described embodiment. Thus, the male inserter 112 includes the lock element 118. And the female receiver 114 includes the forward and rearward guide surfaces 122 and 123 defining the lock opening 126, as well as the catch surface 124, all of which are formed by the housing 116.

Figures 9A, 9B, 11:
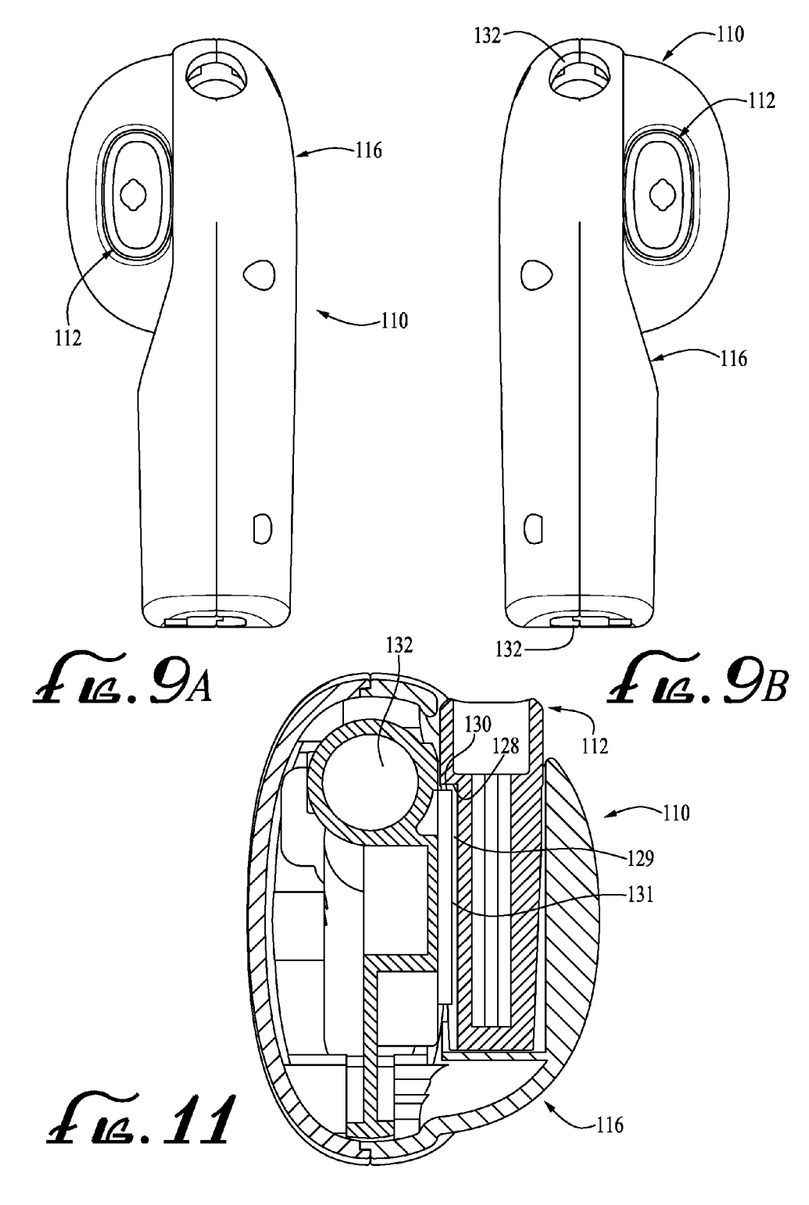
FIGS. 9A-B are top views of two of the mounting mechanisms of FIG. 8, with the mounting mechanisms for use at opposite mounting ends of the toy bar.
FIG. 11 is a transverse cross-sectional view of the mounting mechanism taken at line 11-11 of FIG. 8.
Figure 10:
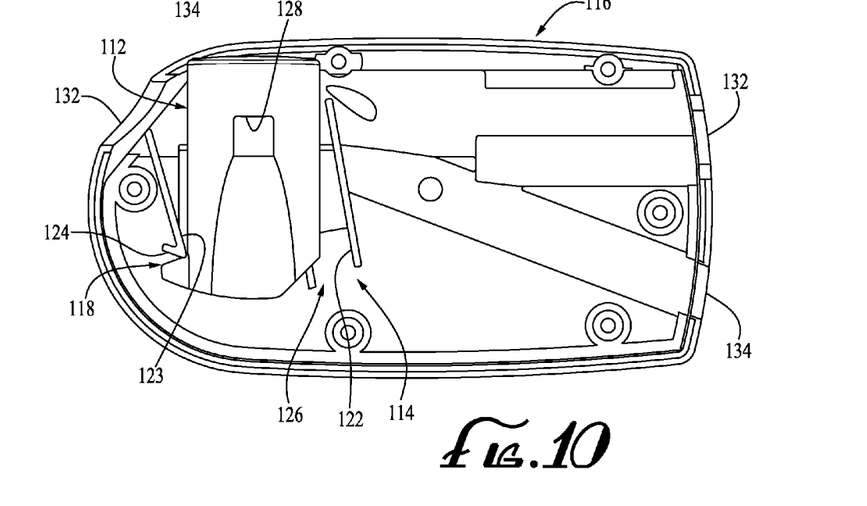
FIG. 10 is a left side view of the mounting mechanism of FIG. 9A, with a portion of the housing removed to reveal the internal components.
Figures 12, 13:
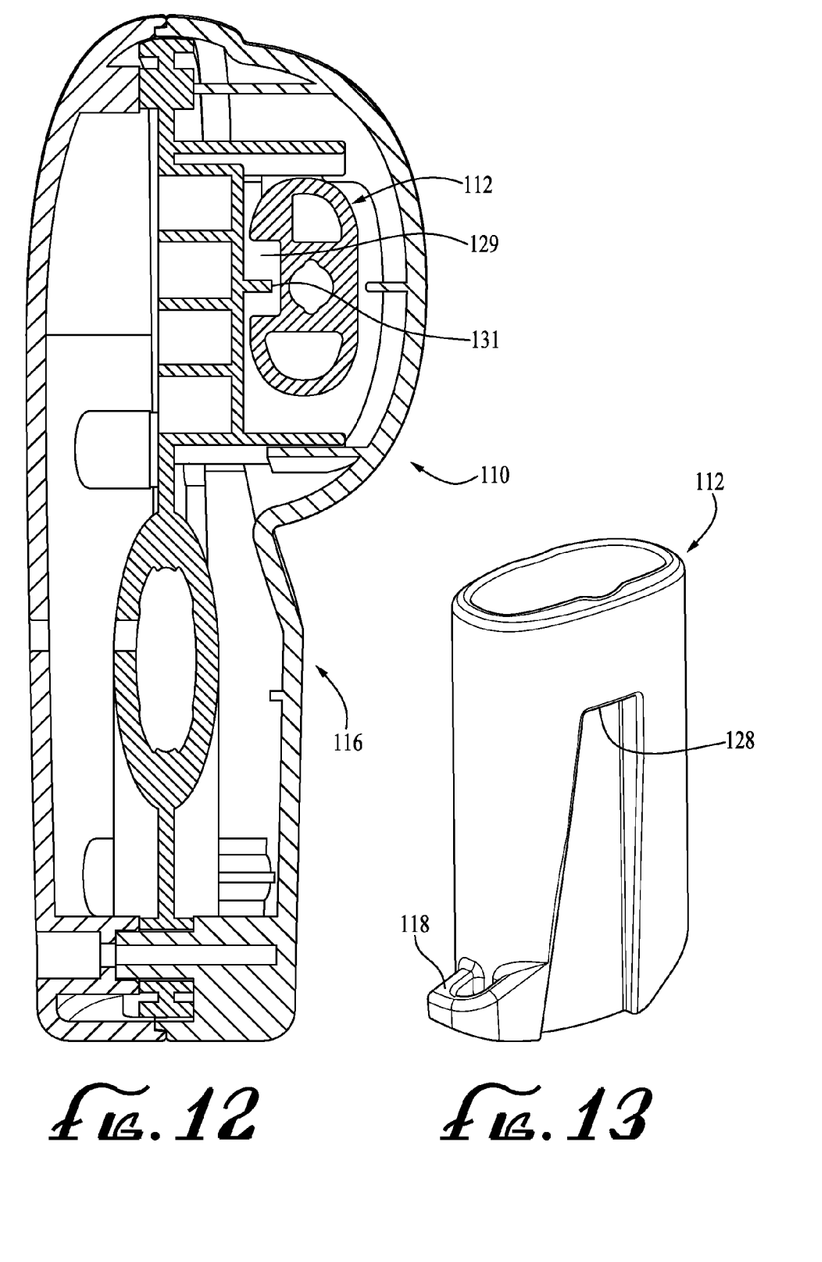
FIG. 12 is a longitudinal cross-sectional view of the mounting mechanism taken at line 12-12 of FIG. 8.
FIG. 13 is a perspective view of a male insertion member of the mounting mechanism of FIG. 8.
Figure 14:
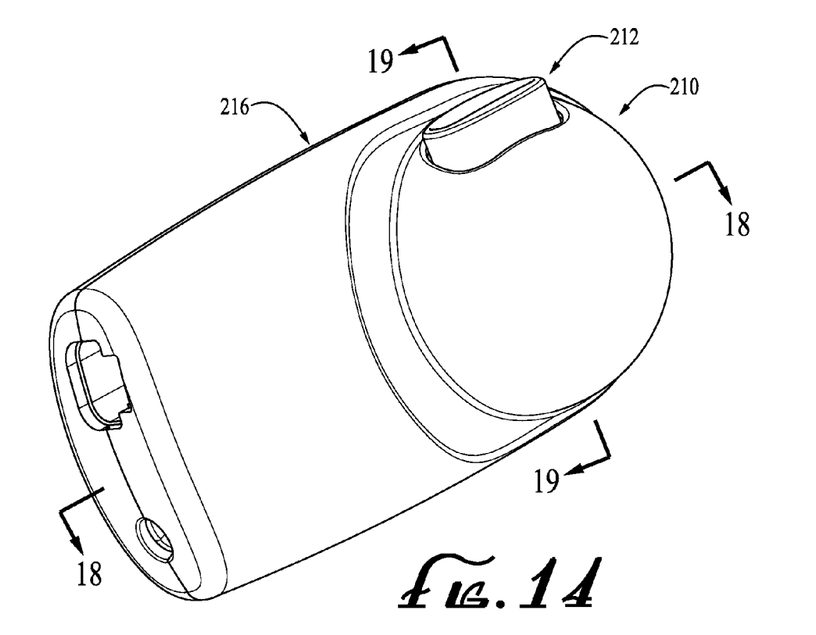
FIG. 14 is a perspective view of a mechanism for mounting a toy bar to a child-support device according to a third example embodiment of the present invention.
Figure 15:
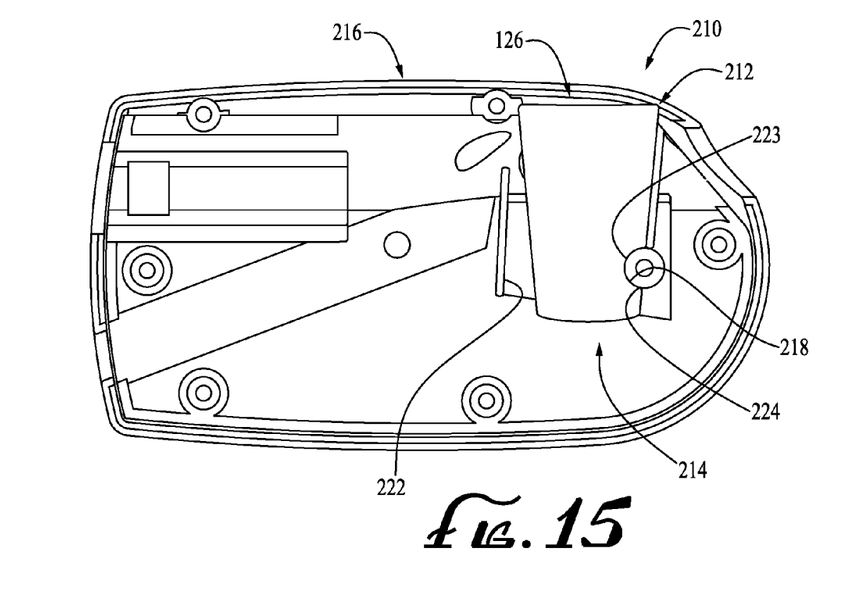
FIG. 15 is a right side view of the mounting mechanism of FIG. 14, with a portion of the housing removed to reveal the internal components.
Figures 16, 17:
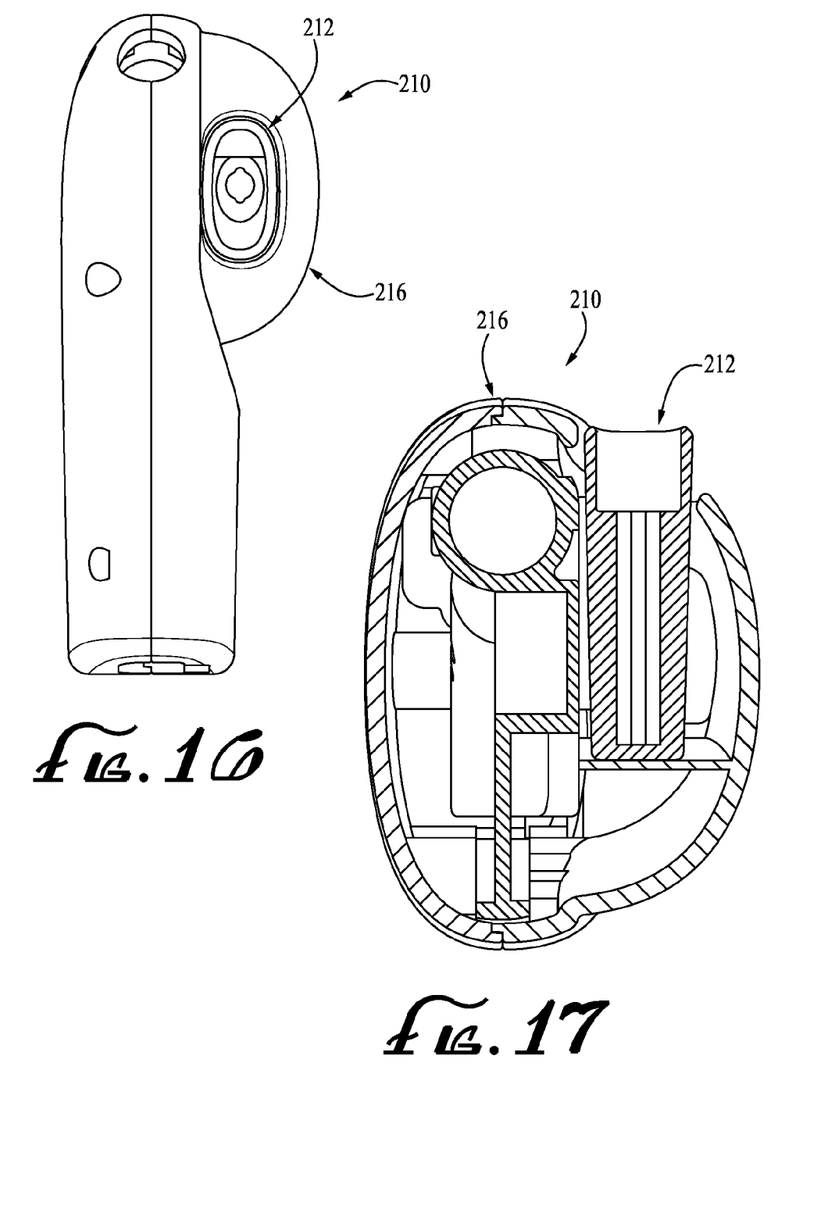
FIG. 16 is a top view of the mounting mechanism of FIG. 14.
FIG. 17 is a transverse cross-sectional view of the mounting mechanism taken at line 17-17 of FIG. 14.
Figure 18:
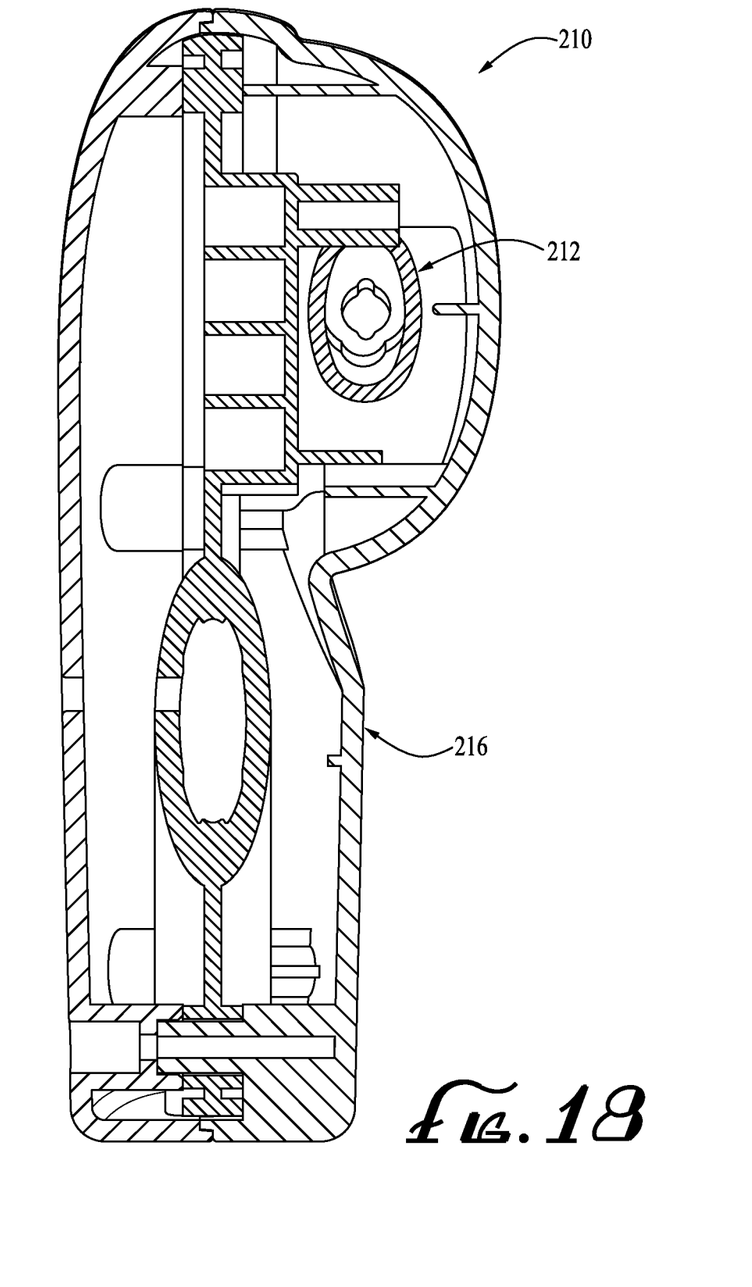
FIG. 18 is a longitudinal cross-sectional view of the mounting mechanism taken at line 18-18 of FIG. 14.

In this embodiment, however, the forward and rearward guide surfaces 122 and 123 are not uniformly spaced apart, with the lock opening 126 defined by them tapered wider closer to its top access end. In addition, the mechanical stop assembly is different, with the engagement surface 128 formed by a top endwall of a channel 129 in the male inserter 112, and the stop surface 130 formed by a top endwall of an arm 131 extending from the housing 116 into the lock opening 126. The channel 129 can be tapered narrower closer to the top for guiding the male inserter 112 into the female receiver 114. Only one channel/arm 129/131 set may be provided on one side of the male inserter 112 to provide a keyed feature so that the male inserter can only be inserted into the female receiver in the proper orientation. These figures also show the holes in the housing 116 for mounting it to the frame of the child-support device, with a hole 132 for receiving the seat support of the frame and a hole 134 for receiving the resiliently flexible arm of the frame. As FIGS. 9A-B show, typically two mounting mechanisms 110 are provided, one at each mounting end of the toy bar, and one a mirror image of the other.

FIGS. 14-18 show a mechanism 210 for mounting a toy bar to a child-support device according to a third example embodiment of the invention. The mounting mechanism 210 of this embodiment is substantially similar to that of the above-described embodiment. Thus, the male inserter 212 includes the lock element 218. And the female receiver 214 includes the forward and rearward guide surfaces 222 and 223 defining the lock opening 226, as well as the catch surface 224, all of which are formed by the housing 216.

In this embodiment, however, the male inserter 212 is tapered wider closer to its top to guide it into the female receiver 214. In addition, the lock element 218 is provided by a lower surface of a semi-circular notch in the male inserter 212, and the catch surface 224 is provided by a lower surface of a pin extending from the housing 216 into the lock opening 226. With the pin forming the catch surface 224, the rearward guide surface 223 is formed (at least in part) by a side surface of the pin.

While the invention has been described with reference to preferred and example embodiments, it will be understood by those skilled in the art that a variety of modifications, additions and deletions are within the scope of the invention, as defined by the following claims.

What is claimed is:

1. A mechanism for mounting a toy bar to a child-support device, the mounting mechanism comprising:
   a male inserter fixed to one of the toy bar and the child-support device, the male inserter including a lock element; and
   a female receiver fixed to the other one of the toy bar and the child-support device, the female receiver including a lock opening that receives the male inserter and a catch surface that is selectively engaged by the lock element, wherein the catch surface is defined inside the female receiver,
wherein the toy bar moves between an unlocked position and a locked position, in response thereto the male inserter moves relative to the female receiver between the unlocked position and the locked position, in the locked position the lock element of the male inserter engages the catch surface of the female receiver to retain the male inserter in the lock opening, and in the unlocked position the lock element is disengaged from the catch surface thereby permitting the male inserter to be withdrawn from the lock opening, wherein the movement of the toy bar is pivotal, the movement of the male inserter relative to the female receiver in response thereto is pivotal, in the unlocked position the toy bar and the fixed thereto male inserter or female receiver is generally upright, and in the locked position the toy bar and the fixed thereto male inserter or female receiver is inclined relative to the locked position.

2. The mounting mechanism of claim 1, wherein with the male inserter inserted into the lock opening with the lock element inserted past the catch surface, the toy bar pivots from the upright unlocked position to the inclined locked position under the force of gravity, which relatively pivots the lock element behind and into locking engagement with the catch surface.

3. The mounting mechanism of claim 2, wherein in the inclined locked position, the force of gravity on the toy bar pivotally biases and retains the lock element of the male inserter in locking engagement with the catch surface, so the force of gravity on the toy bar must be overcome for the toy bar to pivot back to the upright unlocked position.

4. The mounting mechanism of claim 2, wherein in the inclined locked position the toy bar and the attached thereto male inserter or female receiver are inclined forward, and wherein applying a force downward, forward, or both, on the toy bar in the inclined-forward locked position generates retention forces holding the lock element of the male inserter in locking engagement with the catch surface.

5. The mounting mechanism of claim 2, wherein applying an upward lifting force to the toy bar causes the male inserter to pivot back from the inclined locked position toward the upright unlocked position, and further applying the upward lifting force to the toy bar pulls the male inserter in the upright unlocked position up through the lock opening, thereby automatically detaching the toy bar from the child-support device.

6. The mounting mechanism of claim 1, further comprising a mechanical stop including an engagement surface defined by the male inserter and a stop surface defined by the female receiver, the engagement and stop surfaces configured to limit an insertion depth of the male inserter relative to the female receiver to where the lock element of the male inserter is past the catch surface of the female receiver so that the lock element can be relatively pivoted into locking engagement with and behind the catch surface.

7. The mounting mechanism of claim 1, wherein in a pivot plane of the male inserter and at a narrowest part of the lock opening, a lateral dimension of a footprint of the male inserter, including the lock element, in the upright unlocked position is X, a lateral dimension of the lock opening between the guide surfaces is Y, and a lateral dimension of a footprint of the male inserter, including the lock element, in the inclined locked position is Z, wherein Z is larger than Y, which is larger than X.

8. The mounting mechanism of claim 1, wherein the lock element extends laterally rearward relative to an axis of relative travel of the male inserter.

9. The mounting mechanism of claim 8, wherein the lock element is inclined downward as it extends rearward away from the male inserter to induce the male inserter to relatively pivot toward the inclined unlocked position upon application of an upward lifting force on the toy bar.

10. The mounting mechanism of claim 8, wherein the female receiver includes spaced-apart forward and rearward guide surfaces that cooperatively define the lock opening, wherein the catch surface extends laterally behind the rearward guide surface.

11. The mounting mechanism of claim 10, wherein the lock element and the catch surface extend in a plane in which the male inserter pivots.

12. The mounting mechanism of claim 10, wherein with the mounting mechanism mounted for use, the forward and rearward guide surfaces are generally upright to receive the male inserter in the upright unlocked position but tilted forward slightly to induce the toy bar to tilt forward so that the toy bar will then pivot forward by gravity to the locked position.

13. The mounting mechanism of claim 1, wherein in the locked position the toy bar, and the fixed thereto male inserter or female receiver, are inclined relative to the locked position.

14. The mounting mechanism of claim 1, wherein the male inserter is fixed to a mounting portion of the toy bar for movement therewith, and the female receiver is included in a housing fixed to a frame of the child-support device for movement therewith.

15. A mechanism for mounting a toy bar to a child-support device, the mounting mechanism comprising:
a male inserter fixed to a mounting portion of the toy bar for pivotal movement therewith between an unlocked position and a locked position, the male inserter and the toy bar generally upright in the unlocked position and in the locked position inclined forward relative to the unlocked position, the male inserter including a lock element extending laterally rearward relative to an axis of travel of the male inserter; and
a female receiver in a housing fixed to a frame of the child-support device for movement therewith, the female receiver including a lock opening, spaced-apart forward and rearward guide surfaces, and a catch surface, the guide surfaces cooperatively defining the lock opening, the lock opening receiving the male inserter, and the catch surface extending laterally rearward relative to the rearward guide surface and selectively engaged by the lock element in the locked position,
wherein in the inclined locked position the lock element of the male inserter engages the catch surface of the female receiver to retain the male inserter in the lock opening, and in the upright unlocked position the lock element is disengaged from the catch surface thereby permitting the male inserter to be withdrawn from the lock opening.

16. The mounting mechanism of claim 15, wherein with the male inserter inserted into the lock opening with the lock element inserted past the catch surface, the toy bar pivots from the upright unlocked position to the inclined-forward locked position under the force of gravity, which pivots the lock element under and into locking engagement with the catch surface.

17. The mounting mechanism of claim 15, wherein in the inclined-forward locked position, the force of gravity on the toy bar pivotally biases and retains the lock element of the male inserter in locking engagement with the catch surface, so the force of gravity on the toy bar must be overcome for the toy bar to pivot back rearward to the upright unlocked position.

18. The mounting mechanism of claim 15, wherein applying an upward lifting force to the toy bar causes the male inserter to pivot back rearward from the inclined-forward locked position toward the upright unlocked position, and further applying the upward lifting force to the toy bar pulls the male inserter in the upright unlocked position up through the lock opening, thereby automatically detaching the toy bar from the child-support device.

19. A mechanism for mounting a toy bar to a child-support device, the mounting mechanism comprising:

a male inserter fixed to one of the toy bar and the child-support device, the male inserter including a lock element; and a female receiver fixed to the other one of the toy bar and the child-support device, the female receiver including a lock opening that receives the male inserter and a catch surface that is selectively engaged by the lock element, wherein the toy bar pivots between an unlocked position and a locked position to pivot the male inserter relative to the female receiver between the unlocked position and the locked position, in the unlocked position the toy bar and the attached thereto male inserter or female receiver are generally upright, and in the locked position the toy bar and the attached thereto male inserter or female receiver are inclined forward relative to the unlocked position, wherein with the male inserter inserted into the lock opening with the lock element inserted past the catch surface, the toy bar pivots from the upright unlocked position to the inclined-forward locked position under the force of gravity, which pivots the lock element under and into locking engagement with the catch surface and biases it there to retain the male inserter in the lock opening, and wherein applying an upward lifting force to the toy bar causes the male inserter to pivot from the inclined-forward locked position toward the upright unlocked position thereby disengaging the lock element from the catch surface, and further applying the upward lifting force to the toy bar pulls the male inserter in the upright unlocked position up through the lock opening, thereby automatically detaching the toy bar from the child-support device.

20. The mounting mechanism of claim 19, wherein the child-support device is a bouncer, rocker, swing, motion device, car seat, carrier, stroller, bassinet, crib, play yard, high chair, or other device for supporting the child in a sitting, reclining, lying, or standing position.

* * * * *